United States Patent
Ferguson et al.

(10) Patent No.: US 7,590,722 B2
(45) Date of Patent: *Sep. 15, 2009

(54) APPARATUS AND METHODS FOR MANAGING DATA USED BY A MOBILE DEVICE

(75) Inventors: Tabitha K. Ferguson, Waterloo (CA); Wen Gao, Waterloo (CA); Pascal Gaudette, Ottawa (CA); James A. Godfrey, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 11/942,164

(22) Filed: Nov. 19, 2007

(65) Prior Publication Data

US 2008/0071798 A1    Mar. 20, 2008

Related U.S. Application Data

(63) Continuation of application No. 10/776,900, filed on Feb. 11, 2004, now Pat. No. 7,321,930.

(51) Int. Cl.
    *G06F 15/173*    (2006.01)
(52) U.S. Cl. ...................................... 709/223
(58) Field of Classification Search ................ 709/223, 709/203, 213, 217; 707/200; 711/118; 712/205
    See application file for complete search history.

(56) References Cited

U.S. PATENT DOCUMENTS

| 5,794,061 | A | * | 8/1998 | Hansen et al. | 712/1 |
| 6,128,661 | A | * | 10/2000 | Flanagin et al. | 709/227 |
| 6,629,187 | B1 | * | 9/2003 | Krueger et al. | 711/3 |
| 7,139,864 | B2 | * | 11/2006 | Bennett et al. | 711/103 |
| 7,185,155 | B2 | * | 2/2007 | Sechrest et al. | 711/158 |

FOREIGN PATENT DOCUMENTS

GB    2 377 135 A    12/2002

OTHER PUBLICATIONS

European Examination Report. Application No. 03 815 813.5-1249 Nov. 21, 2005.

* cited by examiner

*Primary Examiner*—David Y Eng
(74) *Attorney, Agent, or Firm*—Bereskin & Parr LLP/S.E.N.C.R.L., s.r.l.

(57) ABSTRACT

Apparatus and methods for managing data used by mobile devices. Data can be retrieved from a second computing device (e.g. a server) where it is stored on a storage medium (e.g. a disk). A subset of the data of a data record stored in the storage medium, or one or more pointers to the data of a data record stored on the storage medium is stored in a memory of the mobile device so that it is not necessary to store a given data record in its entirety in the memory of the mobile device.

34 Claims, 6 Drawing Sheets

APPARATUS AND METHODS FOR MANAGING DATA USED BY A MOBILE DEVICE

CROSS-REFERENCE TO RELATED APPLICATION

This application is a continuation of U.S. patent application Ser. No. 10/776,900 filed Feb. 11, 2004 entitled APPARATUS AND METHODS FOR MANAGING DATA USED BY A MOBILE DEVICE. U.S. patent application Ser. No. 10/776,900 claims priority from PCT/CA2003/000203 filed Feb. 12, 2003. The contents of U.S. patent application Ser. No. 10/776,900 and PCT Application No. PCT/CA2003/000203 are herein incorporated by reference.

TECHNICAL FIELD

The invention relates generally to mobile devices, and in particular, to an apparatus and methods for managing data used by mobile devices.

BACKGROUND

Computing devices have a limited supply of physical memory that is used in the execution of computing applications to hold data and instructions. This physical memory is typically made available to and shared between multiple applications and possibly multiple users.

Most modern operating systems enable multiple applications to execute conceptually, from the perspective of the user, at the same time. These multi-tasking operating systems can enable the sharing of one or more processors between the applications, using a variety of known techniques.

The execution of multiple applications in this manner, however, also places increased demands on the fixed amount of physical memory of a computing system or device, as several applications may be competing for space in physical memory. Even in instances where only a single application is to be executed, if the application program is large, it may be difficult to find sufficient space in physical memory to store it. Furthermore, if multiple application programs were to be loaded in their entirety into physical memory, then fewer applications would be able to execute, even though certain sections of the application programs may not be needed in physical memory during a given phase of execution of the loaded applications at a particular point in time.

Accordingly, modern operating systems of many computing systems or devices, such as desktop or laptop devices, manage physical memory ("real storage") using a technique called virtual storage or virtual memory. The virtual storage concept refers to a memory management technique in which part of an application program is stored on a separate storage medium, such as a disk, and is brought into the physical memory of the computing system or device for execution only as needed. The storage medium acts as an extension of the physical memory that is made available for applications and data. Since only part of an application program is in real storage at any given time, the amount of physical memory needed to execute a given application can be minimized.

Memory management problems that virtual storage seeks to address may be more prominent in small computing devices. In particular, mobile devices (e.g. handheld computers) generally have limited real storage available to them given their size, and given other resource constraints such as battery life. However, unlike many desktop or laptop computing systems and devices, mobile devices are generally not constructed or equipped with higher capacity storage media such as hard disks or the like, which might be used as virtual storage.

SUMMARY

The present invention relates to an apparatus and methods for managing data used by mobile devices.

In one aspect of the present invention, there is provided a method for managing data used by a first mobile device, wherein the data is stored as a plurality of data records that are saved in a memory of the first mobile device, the method comprising the steps of identifying at least one first data record of the plurality of data records saved in the memory of the first mobile device; saving a first subset of data of each of the at least one first data record to a storage medium residing on a second computing device; deleting the first subset of data of each of the at least one first data record from the memory of the first mobile device, wherein a second subset of data of each of the at least one first data record remains saved in the memory of the first mobile device; for each of the at least one first data record, associating an identifier therewith that can be used to locate the first subset of data thereof as saved on the storage medium; for each of the at least one first data record, saving the identifier associated therewith in the memory of the first mobile device; identifying at least one second selected data record of the plurality of data records saved in the memory of the first mobile device; for each of the at least one second selected data record, determining the location of the first subset of data thereof as saved on the storage medium using the identifier associated therewith; for each of the at least one second selected data record, retrieving at least a subset of the first subset of data thereof from the storage medium; and for each of the at least one second selected data record, saving the at least a subset of the first subset of data thereof as retrieved from the storage medium in the memory of the first mobile device.

In another aspect of the invention, there is provided a method for managing data used by a first mobile device, wherein the data is stored as a plurality of data records that are saved on a storage medium residing on a second computing device, the method comprising the steps of: identifying at least one first data record of the plurality of data records saved on the storage medium; saving a first subset of data of each of the at least one first data record to a memory of the first mobile device, wherein a second subset of data of each of the at least one first data record remains saved on the storage medium; for each of the at least one first data record, associating an identifier therewith that can be used to locate the data thereof as saved on the storage medium; for each of the at least one first data record, saving the identifier associated therewith in the memory of the first mobile device; identifying at least one second selected data record of the plurality of data records saved on the storage medium for which an identifier associated therewith is saved in the memory of the first mobile device; for each of the at least one second selected data record, determining the location of the data thereof as saved on the storage medium using the identifier associated therewith; for each of the at least one second selected data record, retrieving at least a subset of the second subset of data thereof from the storage medium; and for each of the at least one second selected data record, saving the at least a subset of the second subset of data thereof retrieved from the storage medium in the memory of the first mobile device.

In another aspect of the present invention, there is provided a method for managing data used by a first mobile device, wherein the data is stored as a plurality of data records that are saved in a memory of the first mobile device, the method comprising the steps of: identifying at least one first data record of the plurality of data records saved in the memory of the first mobile device; saving the data of each of the at least one first data record as a data record to a storage medium residing on a second computing device; deleting the data of each of the at least one first data record from the memory of the first mobile device; for each of the at least one first data record, associating an identifier therewith that can be used to locate the data thereof as saved on the storage medium; for each of the at least one first data record, saving the identifier associated therewith in the memory of the first mobile device; identifying at least one second selected data record, wherein an identifier associated with each of the at least one second data record is saved in the memory of the first mobile device; for each of the at least one second selected data record, determining the location of the data thereof as saved on the storage medium using the identifier associated therewith; for each of the at least one second selected data record, retrieving at least a subset of the data thereof from the storage medium; and for each of the at least one second selected data record, saving the at least a subset of the data thereof retrieved from the storage medium in the memory of the first mobile device.

In another aspect of the present invention, there is provided a method for managing data used by a first mobile device, wherein the data is stored as a plurality of data records that are saved on a storage medium residing on a second computing device, the method comprising the steps of: identifying at least one first data record of the plurality of data records saved on the storage medium; for each of the at least one first data record, associating an identifier therewith that can be used to locate the data thereof as saved on the storage medium; for each of the at least one first data record, saving the identifier associated therewith in the memory of the first mobile device; identifying at least one second selected data record of the plurality of data records saved on the storage medium for which an identifier associated therewith is saved in the memory of the first mobile device; for each of the at least one second selected data record, determining the location of the data thereof as saved on the storage medium using the identifier associated therewith; for each of the at least one second selected data record, retrieving at least a subset of the data thereof from the storage medium; and for each of the at least one second selected data record, saving the at least a subset of the data thereof retrieved from the storage medium in the memory of the first mobile device.

In another aspect of the present invention, there is provided a mobile device adapted to manage data, comprising: a processor, wherein the processor is controlled by one or more processing modules; a network interface coupled to the processor through which communications to at least one remote computing device is communicated; and a memory coupled to the processor; wherein the processor is adapted to communicate with the at least one remote computing device on which a storage medium resides, wherein the processor is adapted to control the transfer of data between the memory and the storage medium, and wherein at least one of the one or more processing modules are programmed to perform the steps of a method for managing data used by a first mobile device in an embodiment of the present invention.

In another aspect of the present invention, the steps of a method for managing data used by a first mobile device in an embodiment of the present invention may be stored on a computer-readable medium.

The present invention is directed to an apparatus and methods for managing data that permit data stored as data records to be accessed by a mobile device. Data can be retrieved from a second computing device (e.g. a server) where it is stored on a storage medium (e.g. a disk). A subset of the data of a data record stored on the storage medium, or one or more pointers to the data of a data record stored on the storage medium is stored in a memory of the mobile device, so that it is not necessary to store a given data record in its entirety in the memory of the mobile device.

BRIEF DESCRIPTION OF THE DRAWINGS

For a better understanding of the present invention, and to show more clearly how it may be carried into effect, reference will now be made, by way of example, to the accompanying drawings in which.

DETAILED DESCRIPTION

The invention relates to an apparatus and methods for managing data used by mobile devices.

In preferred embodiments of the invention, the methods for managing data may be used in wireless handheld devices, such as Research in Motion Limited's BlackBerry™ devices or certain personal digital assistants (PDAs), for example. The invention may be particularly useful when implemented in such devices, as these devices generally have limited real storage available for storing data and applications within the devices themselves because of their relatively small size.

Figure 1:
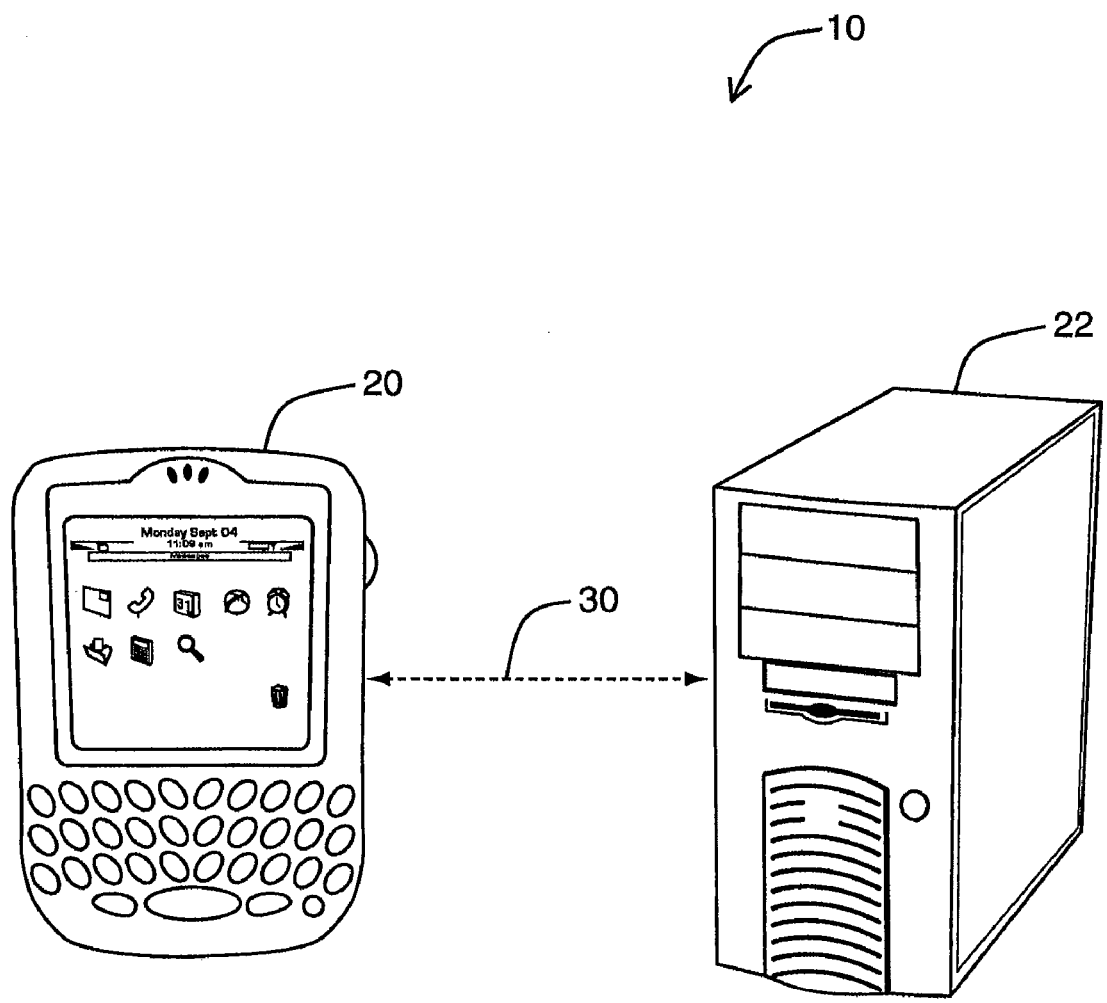
FIG. 1 is a schematic diagram illustrating an example configuration of a system in which a mobile device is connected to a server.

Referring to FIG. 1, a schematic diagram illustrating an example configuration of a system in which a mobile device is connected to a server is shown generally as 10.

In system 10, a mobile device 20 is coupled to a server 22. In this example configuration, mobile device 20 is coupled to a remote server 22 via a wireless communication link 30 through which mobile device 20 can communicate with server 22.

Figure 2:
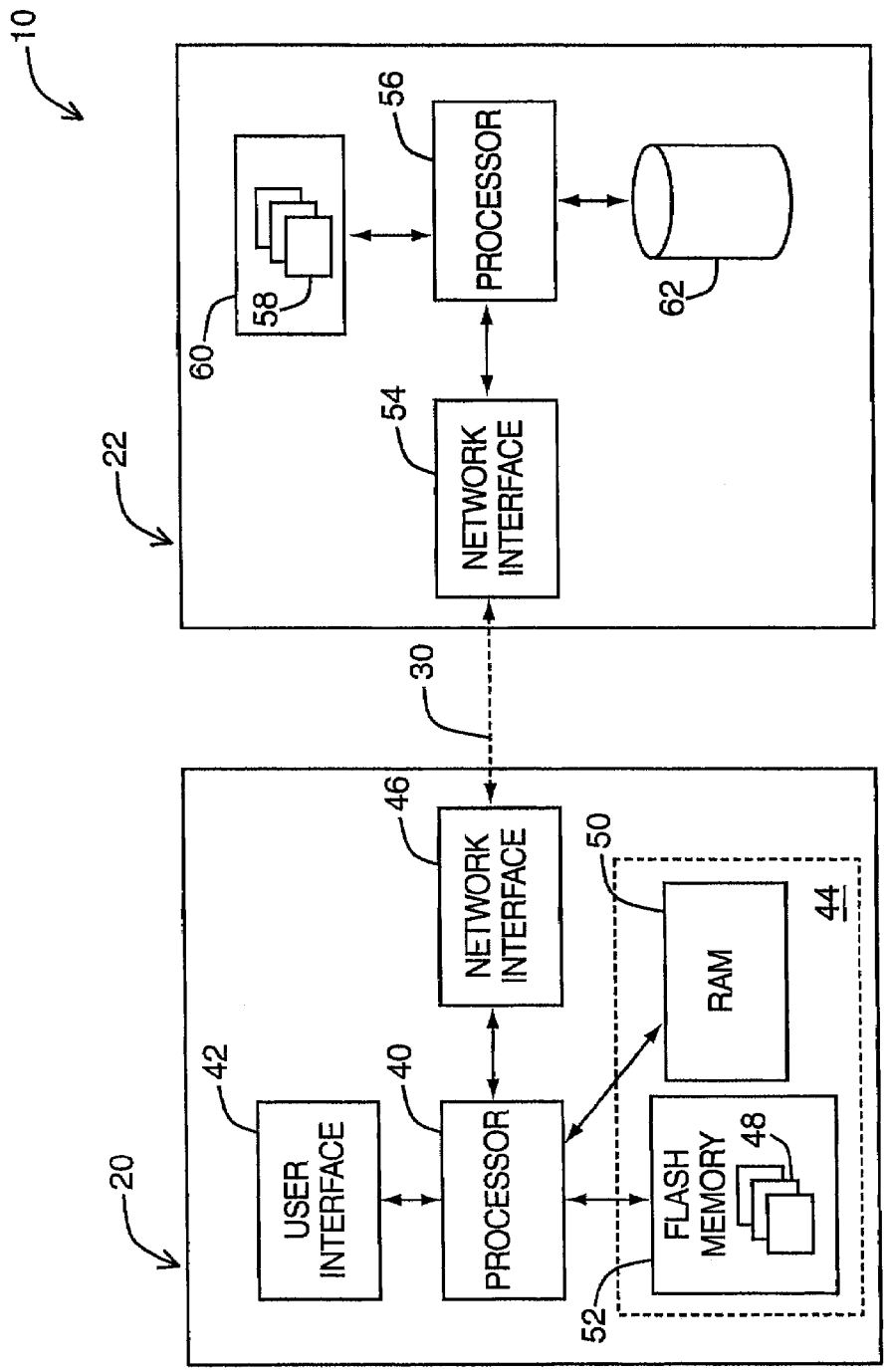
FIG. 2 is a schematic diagram illustrating the components of a mobile device within the example configuration and in accordance with an embodiment of the present invention.

Referring to FIG. 2, a schematic diagram illustrating the components of a mobile device within the example configuration of FIG. 1 and in accordance with an embodiment of the present invention is shown.

In this embodiment of the present invention, mobile device 20 comprises a processor 40, a user interface 42, a memory 44, and a network interface 46.

Processor 40 is controlled by one or more processing modules 48 stored in memory 44. The term "memory" as used herein is not to be understood as being limited to a single memory or storage component or device. Data in memory 44 may be stored in a single memory device, or in multiple memory devices. In this embodiment of the present invention, memory 44 comprises a random access memory (RAM) 50 and a less volatile FLASH memory 52 in which processing modules 48 may be stored pending execution. Data downloaded from server 22 and program applications may be stored in FLASH memory 52, providing persistent memory between shutdowns of mobile device 20. RAM 50 will typically be used for program execution and data manipulation as it will tend to be faster in terms of data access time than FLASH memory 52.

Network interface 46 coupled to processor 40 is adapted to allow mobile device 20 to communicate with server 22 over wireless communication link 30. Server 22 also comprises a network interface 54, one or more processors 56, processing modules 58 in a memory 60, and a storage medium 62.

In accordance with an embodiment of the invention, data may be retrieved by mobile device 20 from server 22 where the data is stored as data records on storage medium 62, which may be a hard disk, for example. A subset of the data of any given data record, or a pointer to the copy of any given data record on server 22 is stored in memory 44 of mobile device 20 instead of the entire given data record. When all or part of a given data record is required by mobile device 20 (e.g. in response to a request for certain data by a user of mobile device 20), the required data can be retrieved from storage medium 62 over wireless communication link 30, and stored in memory 44 of mobile device 20 for subsequent use. Data stored in memory 44 on mobile device 20 that has not been recently used (e.g. corresponding to all or part of a data record) may also be freed to increase the available space in memory 44 of mobile device 20 for other data currently in use by mobile device 20.

In this manner, the present invention facilitates the selective use of local and remote storage to store data and applications used by mobile device 20. Further, the use of storage medium 62 as an extension of memory 44 is hidden from the user of mobile device 20, and does not require the user of mobile device 20 to make extensive configurations (e.g. the user is not required to set up and configure a coupling between mobile device 20 and a remote storage device) in order to take advantage of this feature.

Some example applications of the present invention may include the following:

1. Memory Management for Electronic Mail Messages

In this example application, the present invention may be used to effectively increase the capacity of memory 44 used to store electronic mail ("e-mail") messages, at least conceptually from the perspective of a user of mobile device 20.

As the space in memory 44 of a mobile device 20 available for storage of e-mail messages is limited, many prior art mobile devices delete old e-mail messages from their memory to make space for new messages when the amount of free memory becomes low. However, in accordance with the present invention, the storage of data on storage medium 62 provides a virtual storage mechanism in that a portion or all of the body of a given e-mail message can be saved outside of memory 44 of mobile device 20 for later retrieval. This permits space to be freed in memory 44 while allowing a user to obtain the contents of the e-mail message later if desired.

For example, mobile device 20 may be configured to only store sender and subject header information of selected e-mail messages in memory 44. This typically provides sufficient context for the user to determine if he or she wishes to view the entirety of a given e-mail message, in which case mobile device 20 would retrieve the requisite data from storage medium 62.

As a further example, when a user views a selected e-mail message, a subset of data associated with the message can be initially retrieved to further save space, and additional data may be subsequently retrieved as needed. For instance, a part of a list of recipients of the message may be initially retrieved. The entire recipient list (or additional entries therein) may be subsequently retrieved for viewing by the user (i.e. from the storage medium), as required. Moreover, parts of the body of an e-mail message may be retrieved for viewing by the user, with other parts retrieved as required. This allows a user to view the body of an e-mail message in sections, as may be selected by the user.

2. Memory Management for Contact Entries

In this example application, the present invention may be used to effectively increase the capacity of memory 44 used to store contact entries, at least conceptually from the perspective of a user of mobile device 20. A contact entry may be defined as a data record containing information relating to an entity (e.g. an individual, a group of individuals, a business, etc.), and may include such data items as an individual's title, address, e-mail address, phone numbers (e.g. home phone, business phone, mobile phone, pager), and personal identification numbers (PINs), for example.

As the space in memory 44 of a mobile device 20 available for storage of contact entries is limited, many prior art mobile devices require the user to delete existing contact entries before adding new contact entries when memory 44 is considered full. However, in accordance with the present invention, the storage of data on storage medium 62 provides a virtual storage mechanism in that a portion or all of the information in a given contact entry can be saved outside of memory 44 of mobile device 20 for later retrieval. This permits space to be freed in memory 44 while allowing a user to obtain other information in the contact entry later if desired.

For example, mobile device 20 may be configured to only store more frequently used data items such as e-mail addresses or phone numbers in memory 44, but not to store in memory 44 less frequently used data items such as an individual's title or address. If the user wishes to access or view information in a given contact entry that is not currently stored in memory 44, mobile device 20 would retrieve the requisite data from storage medium 62.

As a further example, data may be retrieved from storage medium 62 in response to a user action. For instance, a user may select a name corresponding to a given contact entry, and request data pertaining to one or more other fields, such as the e-mail address for that user, from a pull-down menu. The e-mail address would then be retrieved from storage medium 62 if not already in memory 44, but other fields need not be retrieved at that time.

3. Memory Management for Calendar Entries

In this example application, the present invention may be used to effectively increase the capacity of memory 44 used to store calendar entries, at least conceptually from the perspective of a user of mobile device 20. A calendar entry may be defined as a data record containing information associated with a particular date (i.e. a specific date, or a day that repeats, e.g. at an interval such as daily, weekly, monthly, or yearly for example) and/or time of day (i.e. a specific time or a time that repeats, e.g. at an interval such as hourly for example), and may include such data items as a description or title, a date, a time, an alarm, appointment notes, and location, attendee, and organizer information with respect to meeting items, for example.

As the space in memory 44 of a mobile device 20 available for storage of calendar entries is limited, many prior art mobile devices delete old calendar entries before adding new calendar entries when memory 44 is considered full. However, in accordance with the present invention, the storage of data on storage medium 62 provides a virtual storage mechanism in that a portion or all of the information in a given calendar entry can be saved outside of memory 44 of mobile device 20 for later retrieval. This permits space to be freed in memory 44 while allowing a user to obtain other information in the calendar entry later if desired.

For example, mobile device 20 may be configured to only store more frequently used data items such as an appointment date, an appointment time, a description of the calendar entry and alarms in memory 44, but not to store less frequently accessed data items such as appointment notes. If the user wishes to access or view information in a given calendar entry that is not currently stored in memory 44 such as appointment notes, mobile device 20 would retrieve the requisite data from storage medium 62. This data may be retrieved upon request or within a period directly preceding the corresponding appointment time.

Other applications may also include storing and selectively retrieving items from a list of bookmarks for a browser application, or data in a notepad document or other document, for example.

The applications described above are provided as examples only to facilitate better understanding of the invention; other applications of the invention not described in detail herein are possible.

Examples of methods of managing data used by mobile device 20 in accordance with several embodiments of the present invention are described herein with reference to FIGS. 3A and 3B, FIGS. 4A and 4B, FIGS. 5A and 5B, and FIGS. 6A and 6B.

Figure 3A:
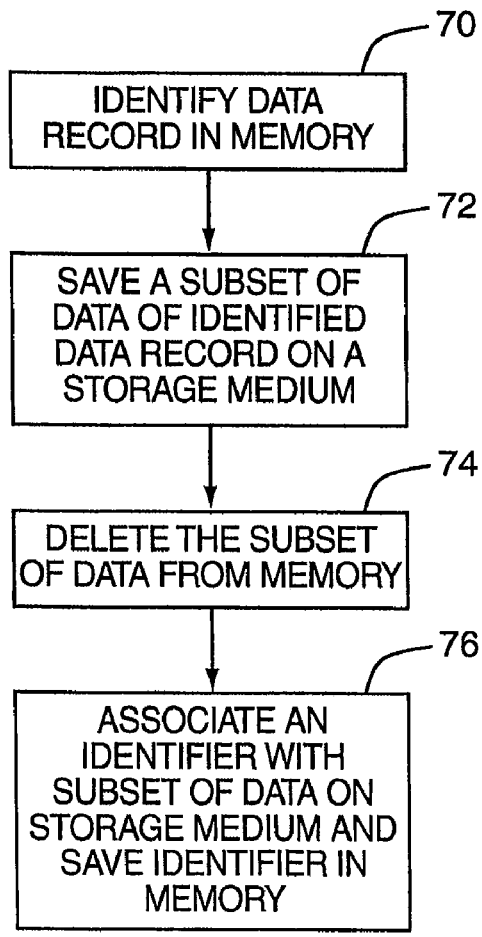
FIGS. 3A and 3B are flowcharts illustrating the steps of a method of managing data used by a mobile device in accordance with an embodiment of the present invention.
Figure 3B:
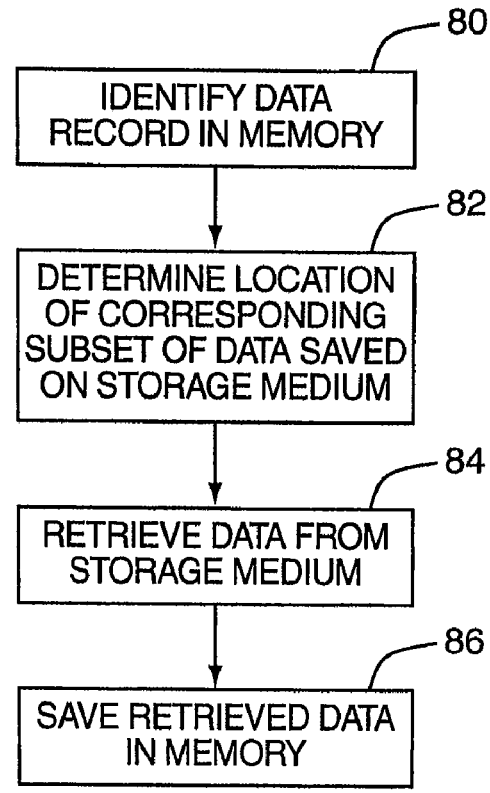

Referring to FIGS. 3A and 3B, a flowchart illustrating the steps of a method of managing data used by a mobile device (e.g. mobile device 20 of FIGS. 1 and 2) in accordance with an embodiment of the invention is shown.

In this embodiment of the invention, the method comprises steps performed in saving a subset of data of one or more data records currently stored in a memory (e.g. memory 44 of FIG. 2) of the mobile device to a storage medium (e.g. storage medium 62 on remote server 22 of FIG. 2) for later retrieval, described with reference to FIG. 3A. These steps may be performed when there is a need to free space in memory, for example.

Referring to FIG. 3A, at step 70, a data record in memory is identified.

At step 72, a subset of data of the data record identified at step 70 is saved on the storage medium.

At step 74, the data saved on the storage medium at step 72 is deleted from memory, to free space in memory.

At step 76, an identifier is associated with the data saved on the storage medium, and then saved in memory. This identifier can be subsequently used to locate the saved data on the storage medium. This identifier may be one or more numerical indices (i.e. numeric values uniquely assigned to each of multiple records) or one or more pointers to the data, for example. Techniques used to generate identifiers and to prevent clashing of identifiers as known in the art may be employed in the present invention.

The steps shown in FIG. 3A may be repeated for multiple data records.

The method also comprises steps performed in subsequently retrieving data of selected data records from the storage medium for saving in the memory of the mobile device, described with reference to FIG. 3B. These steps may be performed when there is a need to retrieve certain data items not currently stored in memory for use by the mobile device, for example.

Referring to FIG. 3B, at step 80, a selected data record is identified.

At step 82, the location of the corresponding data saved on the storage medium (i.e. the subset of data of the selected data record that was saved to the storage medium at step 72 of FIG. 3A) is determined.

At step 84, the corresponding data saved on the storage medium, or a subset thereof if only a subset is required, is retrieved from the storage medium.

At step 86, data retrieved from the storage medium at step 84 is saved in memory for use by the mobile device.

The steps shown in FIG. 3B may be repeated for multiple selected data records.

Figure 4A:
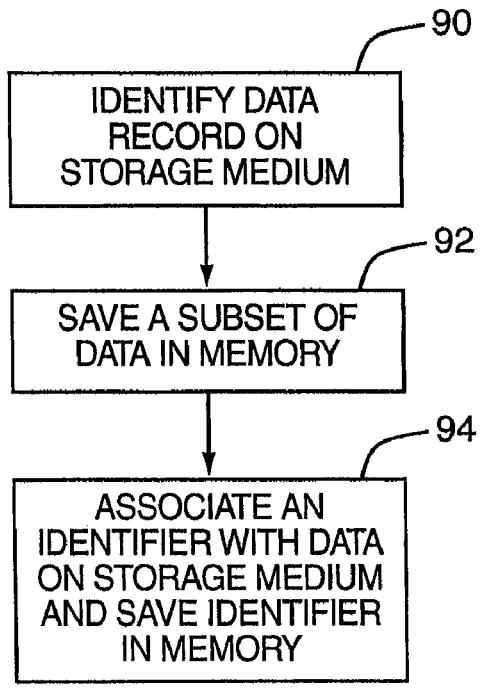
FIGS. 4A and 4B are flowcharts illustrating the steps of a method of managing data used by a mobile device in accordance with another embodiment of the present invention.
Figure 4B:
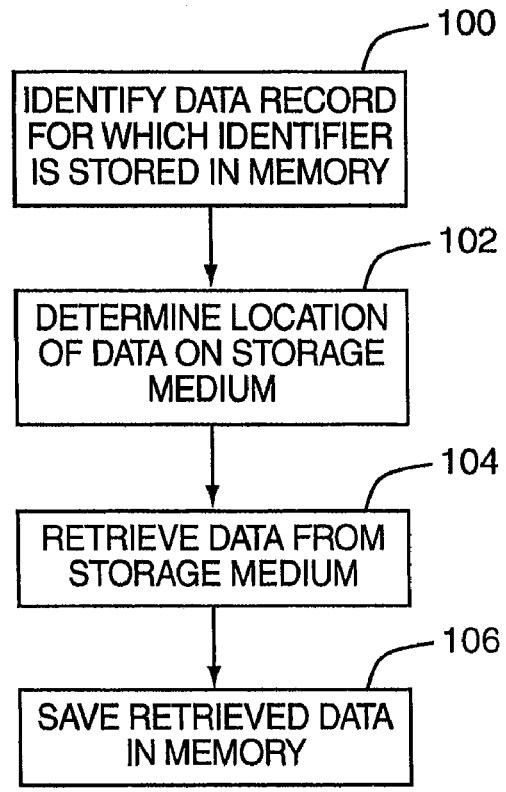

Referring to FIGS. 4A and 4B, a flowchart illustrating the steps of a method of managing data used by a mobile device (e.g. mobile device 20 of FIGS. 1 and 2) in accordance with another embodiment of the invention is shown.

In this embodiment of the invention, the method comprises steps performed in saving a subset of data of one or more data records currently stored in a storage medium (e.g. storage medium 62 on remote server 22 of FIG. 2) to a memory (e.g. memory 44 of FIG. 2) of the mobile device, leaving the remainder of the data of the data records on the storage medium for later retrieval, described with reference to FIG. 4A. These steps may be performed when there is a need to store certain frequently accessed data items in memory, for example.

Referring to FIG. 4A, at step 90, a data record stored on the storage medium is identified.

At step 92, a subset of data of the data record identified at step 90 is saved in memory.

At step 94, an identifier is associated with the data saved on the storage medium, and then saved in memory. This identifier can be subsequently used to locate the saved data on the storage medium. This identifier may be one or more numerical indices (i.e. numeric values uniquely assigned to each of multiple records) or one or more pointers to the data, for example. Techniques used to generate identifiers and to prevent clashing of identifiers as known in the art may be employed in the present invention.

The steps shown in FIG. 4A may be repeated for multiple data records.

The method also comprises steps performed in subsequently retrieving additional data of selected data records from the storage medium for saving in the memory of the mobile device, described with reference to FIG. 4B. These steps may be performed when there is a need to retrieve certain data items not currently stored in memory for use by the mobile device, for example.

Referring to FIG. 4B, at step 100, a selected data record for which an identifier stored in memory is associated is identified.

At step 102, the location of the data of the selected data record saved on the storage medium is determined.

At step 104, the data of the selected data record, or a subset thereof if only a subset is required, is retrieved from the storage medium.

At step 106, data retrieved from the storage medium at step 104 is saved in memory for use by the mobile device.

The steps shown in FIG. 4B may be repeated for multiple selected data records.

Figure 5A:
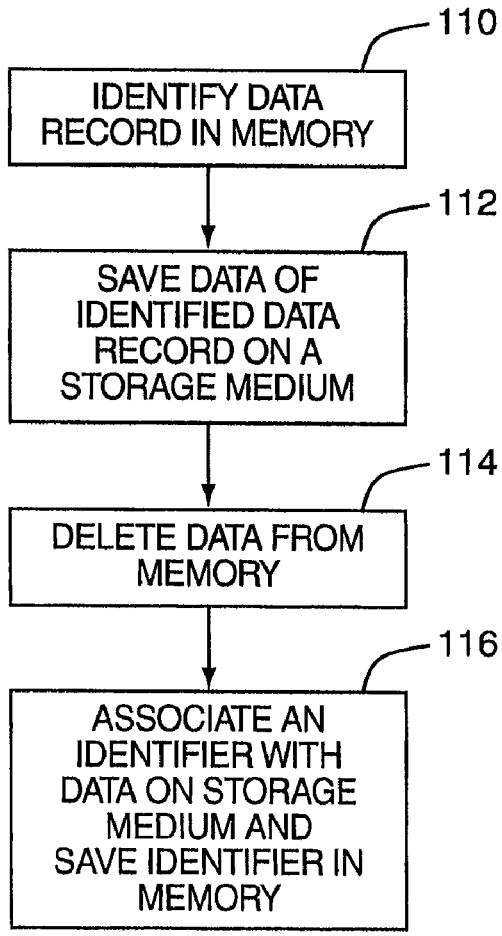
FIGS. 5A and 5B are flowcharts illustrating the steps of a method of managing data used by a mobile device in accordance with another embodiment of the present invention.
Figure 5B:
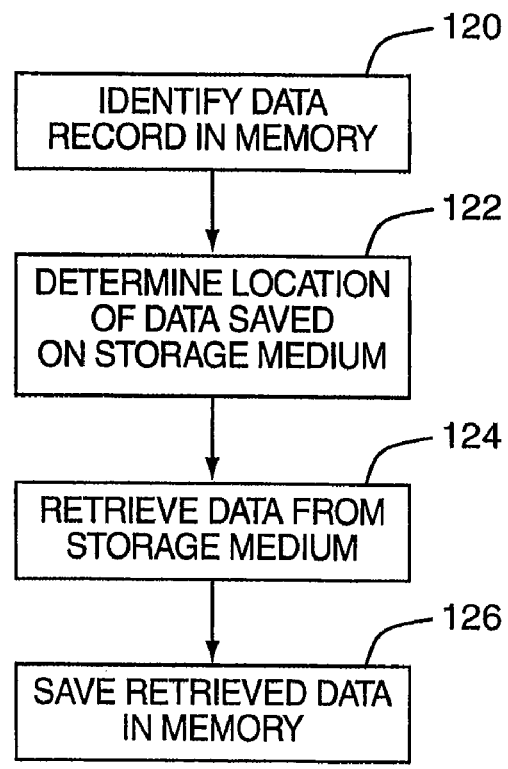

Referring to FIGS. 5A and 5B, a flowchart illustrating the steps of a method of managing data used by a mobile device (e.g. mobile device 20 of FIGS. 1 and 2) in accordance with another embodiment of the invention is shown.

In this embodiment of the invention, the method comprises steps performed in saving data pertaining to one or more data records currently stored in a memory (e.g. memory 44 of FIG. 2) of the mobile device to a storage medium (e.g. storage medium 62 on remote server 22 of FIG. 2) for later retrieval, described with reference to FIG. 5A. These steps may be performed when there is a need to free space in memory by saving all the data of a data record on the storage medium, and when only a means to locate the data of a data record on the storage medium is to be stored in memory, for example.

Referring to FIG. 5A, at step 110, a data record in memory is identified.

At step 112, data of the data record identified at step 110 is saved on the storage medium.

At step 114, the data saved on the storage medium at step 112 is deleted from memory, to free space in memory.

At step 116, an identifier is associated with the data saved on the storage medium, and then saved in memory. This identifier can be subsequently used to locate the saved data on the storage medium. This identifier may be one or more numerical indices (i.e. numeric values uniquely assigned to each of multiple records) or one or more pointers to the data, for example. Techniques used to generate identifiers and to prevent clashing of identifiers as known in the art may be employed in the present invention.

The steps shown in FIG. 5A may be repeated for multiple data records.

The method also comprises steps performed in subsequently retrieving data of selected data records from the storage medium for saving in the memory of the mobile device, described with reference to FIG. 5B. These steps may be performed when there is a need to retrieve certain data items from the storage medium for use by the mobile device, for example.

Referring to FIG. 5B, at step 120, a selected data record is identified.

At step 122, the location of the data of the selected data record saved on the storage medium is determined.

At step 124, the data of the selected data record saved on the storage medium, or a subset thereof if only a subset is required, is retrieved from the storage medium.

At step 126, data retrieved from the storage medium at step 124 is saved in memory for use by the mobile device.

The steps shown in FIG. 5B may be repeated for multiple selected data records.

Figures 6A, 6B:
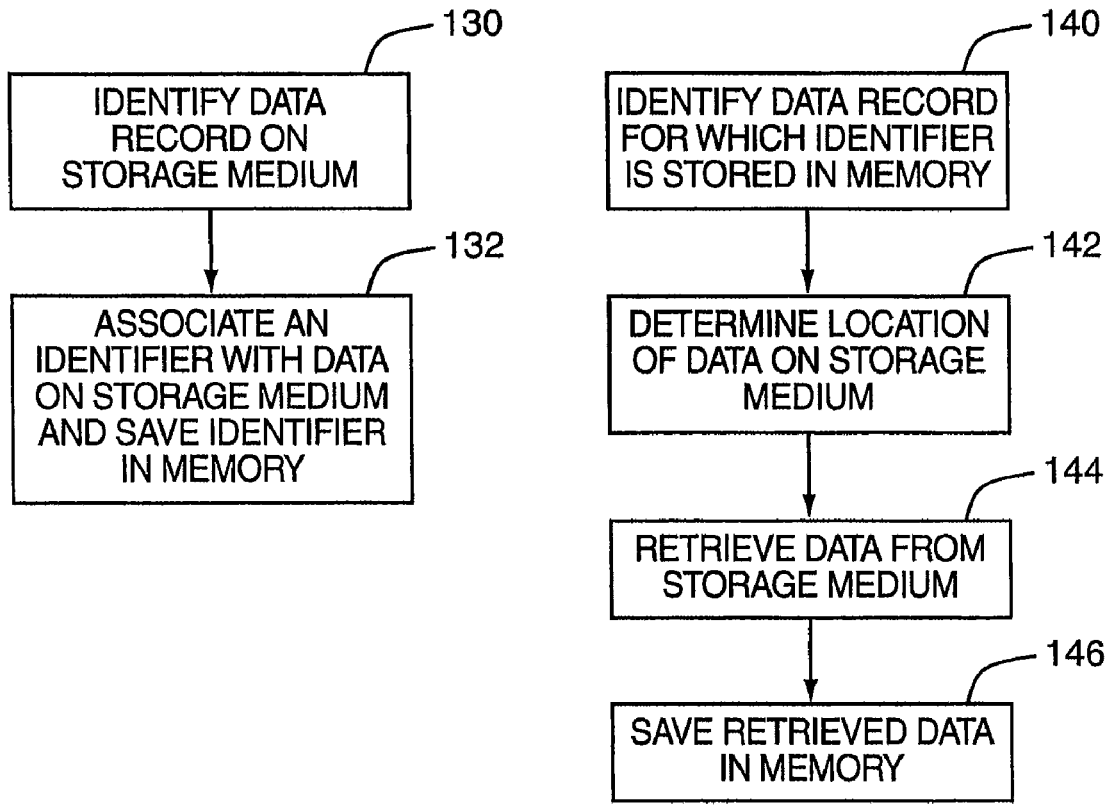
FIGS. 6A and 6B are flowcharts illustrating the steps of a method of managing data used by a mobile device in accordance with another embodiment of the present invention.

Referring to FIGS. 6A and 6B, a flowchart illustrating the steps of a method of managing data used by a mobile device (e.g. mobile device 20 of FIGS. 1 and 2) in accordance with another embodiment of the invention is shown.

In this embodiment of the invention, the method comprises steps performed in saving an identifier that can be used to locate data of one or more data records currently stored in a storage medium (e.g. storage medium 62 on remote server 22 of FIG. 2) to a memory (e.g. memory 44 of FIG. 2) of the mobile device, described with reference to FIG. 6A. These steps may be performed when only a means to locate the data of a data record on the storage medium is to be stored in memory until the data is actually required, for example.

Referring to FIG. 6A, at step 130, a data record stored on the storage medium is identified.

At step 132, an identifier is associated with the data saved on the storage medium, and then saved in memory. This identifier can be subsequently used to locate the saved data on the storage medium. This identifier may be one or more numerical indices (i.e. numeric values uniquely assigned to each of multiple records) or one or more pointers to the data, for example. Techniques used to generate identifiers and to prevent clashing of identifiers as known in the art may be employed in the present invention.

The steps shown in FIG. 6A may be repeated for multiple data records.

The method also comprises steps in subsequently retrieving data of selected data records from the storage medium for saving in the memory of the mobile device, described with reference to FIG. 6B. These steps may be performed when there is a need to retrieve data items for use by the mobile device, for example.

Referring to FIG. 6B, at step 140, a selected data record, for which an identifier stored in memory is associated, is identified.

At step 142, the location of the data of the selected data record saved on the storage medium is determined.

At step 144, the data of the selected data record, or a subset thereof if only a subset is required, is retrieved from the storage medium.

At step 146, data retrieved from the storage medium at step 144 is saved in memory for use by the mobile device.

The steps shown in FIG. 6B may be repeated for multiple selected data records.

In variant embodiments of the invention, the steps in retrieving data from a storage medium for saving in the memory of a mobile device may be performed in accordance with an adaptive technique. An adaptive technique in the context of the present invention may be defined as an optimization algorithm or program that anticipates when specific data items may be needed by a user, and that instructs that those data items be "pre-fetched" or saved in the memory of a mobile device either within a period directly preceding when they are anticipated to be used and/or in response to an action or series of user actions. This may appear to speed up the execution of applications on the mobile device from the perspective of the user. In the context of the example applications described herein, such optimizations may include, for example: retrieving the message bodies of all other e-mail messages in a related chain of e-mail messages; retrieving all data in a contact entry relating to an individual at the time the user receives an e-mail message or phone call from that individual; retrieving appointment notes in advance of an appointment date or time, or those relating to calendar entries for the current week; and retrieving contact information for other recipients listed on an e-mail message or a meeting request.

In variant embodiments of the invention, the storage medium on a server or other computing device may be a hard disk, memory (e.g. RAM, FLASH), or any other storage or memory device, instrument, or mechanism. Furthermore, the term "storage medium" as used herein is not to be understood as being limited to a single memory or storage component or device; in variant embodiments of the invention, the storage medium from which data may be retrieved by a mobile device can be comprised of multiple memory or storage devices of either same or different type.

In variant embodiments of the invention, the steps of a method for managing data used by a first mobile device in an embodiment of the present invention are stored on a computer-readable medium.

The present invention has been described with regard to specific embodiments. However, it will be obvious to persons skilled in the art that a number of other variants and modifications can be made without departing from the scope of the invention defined in the claims appended hereto.

The invention claimed is:

1. A mobile device adapted to manage data, comprising:
   a processor, wherein the processor is controlled by one or more processing modules; and
   a memory coupled to the processor; wherein the processor is adapted to communicate with at least one remote computing device on which a storage medium resides, wherein the processor is adapted to control the transfer of data between the memory and the storage medium, wherein the data is stored as a plurality of data records that are saved in a memory of the mobile device, and wherein at least one of the one or more processing modules are programmed to perform the acts of:
   a) identifying at least one first data record of the plurality of data records saved in the memory of the mobile device;
   b) saving a first subset of data of each of the at least one first data record to the storage medium residing on the at least one remote computing device;
   c) deleting the first subset of data of each of the at least one first data record from the memory of the mobile device, wherein a second subset of data of each of the at least one first data record remains saved in the memory of the mobile device;
   d) for each of the at least one first data record, associating an identifier therewith that can be used to locate the first subset of data thereof as saved on the storage medium;
   e) for each of the at least one first data record, saving the identifier associated therewith in the memory of the mobile device;
   f) identifying at least one second selected data record of the plurality of data records saved in the memory of the mobile device;
   g) for each of the at least one second selected data record, determining the location of the first subset of data thereof as saved on the storage medium using the identifier associated therewith;
   h) for each of the at least one second selected data record, retrieving at least a subset of the first subset of data thereof from the storage medium; and
   i) for each of the at least one second selected data record, saving the at least a subset of the first subset of data thereof, as retrieved from the storage medium, in the memory of the mobile device.

2. The mobile device as claimed in claim 1, wherein the at least one remote computing device comprises a server.

3. The mobile device as claimed in claim 2, wherein the server is coupled to the mobile device by a wireless communication link.

4. The mobile device as claimed in claim 1, wherein each of the plurality of data records comprises data associated with an electronic mail message.

5. The mobile device as claimed in claim 4, wherein the second subset of data of a data record comprises sender and subject header data associated with the electronic mail message.

6. The mobile device as claimed in claim 1, wherein each of the plurality of data records comprises data associated with a contact entry.

7. The mobile device as claimed in claim 1, wherein each of the plurality of data records comprises data associated with a calendar entry.

8. The mobile device as claimed in claim 1, wherein acts f) to i) are performed in accordance with an adaptive technique.

9. The mobile device as claimed in claim 1, wherein each identifier that can be used to locate a first subset of data of a data record as saved on the storage medium comprises either at least one numerical index or at least one pointer.

10. A mobile device adapted to manage data, comprising:
    a processor, wherein the processor is controlled by one or more processing modules; and
    a memory coupled to the processor; wherein the processor is adapted to communicate with at least one remote computing device on which a storage medium resides, wherein the processor is adapted to control the transfer of data between the memory and the storage medium, wherein the data is stored as a plurality of data records that are saved on the storage medium residing on the at least one remote computing device, and wherein at least one of the one or more processing modules are programmed to perform the acts of:
    a) identifying at least one first data record of the plurality of data records saved on the storage medium;
    b) saving a first subset of data of each of the at least one first data record to a memory of the mobile device, wherein a second subset of data of each of the at least one first data record remains saved on the storage medium;
    c) for each of the at least one first data record, associating an identifier therewith that can be used to locate the data thereof as saved on the storage medium;
    d) for each of the at least one first data record, saving the identifier associated therewith in the memory of the mobile device;
    e) identifying at least one second selected data record of the plurality of data records saved on the storage medium for which an identifier associated therewith is saved in the memory of the mobile device;
    f) for each of the at least one second selected data record, determining the location of the data thereof as saved on the storage medium using the identifier associated therewith;
    g) for each of the at least one second selected data record, retrieving at least a subset of the second subset of data thereof from the storage medium; and
    h) for each of the at least one second selected data record, saving the at least a subset of the second subset of data thereof, as retrieved from the storage medium, in the memory of the first mobile device.

11. The mobile device as claimed in claim 10, wherein the at least one remote computing device comprises a server.

12. The mobile device as claimed in claim 11, wherein the server is coupled to the mobile device by a wireless communication link.

13. The mobile device as claimed in claim 10, wherein each of the plurality of data records comprises data associated with an electronic mail message.

14. The mobile device as claimed in claim 13, wherein the first subset of data of a data record comprises sender and subject header data associated with the electronic mail message.

15. The mobile device as claimed in claim 10, wherein each of the plurality of data records comprises data associated with a contact entry.

16. The mobile device as claimed in claim 10, wherein each of the plurality of data records comprises data associated with a calendar entry.

17. The mobile device as claimed in claim 10, wherein acts e) to h) are performed in accordance with an adaptive technique.

18. The mobile device as claimed in claim 10, wherein each identifier that can be used to locate a second subset of data of a data record as saved on the storage medium comprises either at least one numerical index or at least one pointer.

19. A mobile device adapted to manage data, comprising:
a processor, wherein the processor is controlled by one or more processing modules; and
a memory coupled to the processor; wherein the processor is adapted to communicate with at least one remote computing device on which a storage medium resides, wherein the processor is adapted to control the transfer of data between the memory and the storage medium, wherein the data is stored as a plurality of data records that are saved in a memory of the mobile device, and wherein at least one of the one or more processing modules are programmed to perform the acts of:
 a) identifying at least one first data record of the plurality of data records saved in the memory of the mobile device;
 b) saving the data of each of the at least one first data record as a data record to the storage medium residing on the at least one remote computing device;
 c) deleting the data of each of the at least one first data record from the memory of the mobile device;
 d) for each of the at least one first data record, associating an identifier therewith that can be used to locate the data thereof as saved on the storage medium;
 e) for each of the at least one first data record, saving the identifier associated therewith in the memory of the mobile device;
 f) identifying at least one second selected data record, wherein an identifier associated with each of the at least one second data record is saved in the memory of the mobile device
 g) for each of the at least one second selected data record, determining the location of the data thereof as saved on the storage medium using the identifier associated therewith;
 h) for each of the at least one second selected data record, retrieving at least a subset of the data thereof from the storage medium; and
 i) for each of the at least one second selected data record, saving the at least a subset of the data thereof, as retrieved from the storage medium, in the memory of the mobile device.

20. The mobile device as claimed in claim 19, wherein the at least one remote computing device comprises a server.

21. The mobile device as claimed in claim 20, wherein the server is coupled to the mobile device by a wireless communication link.

22. The mobile device as claimed in claim 21, wherein each of the plurality of data records comprises data associated with an electronic mail message.

23. The mobile device as claimed in claim 19, wherein each of the plurality of data records comprises data associated with a contact entry.

24. The mobile device as claimed in claim 19, wherein each of the plurality of data records comprises data associated with a calendar entry.

25. The mobile device as claimed in claim 19, wherein acts f) to i) are performed in accordance with an adaptive technique.

26. The mobile device as claimed in claim 19, wherein each identifier that can be used to locate a first subset of data of a data record as saved on the storage medium comprises either at least one numerical index or at least one pointer.

27. A mobile device adapted to manage data, comprising:
a processor, wherein the processor is controlled by one or more processing modules; and
a memory coupled to the processor; wherein the processor is adapted to communicate with at least one remote computing device on which a storage medium resides, wherein the processor is adapted to control the transfer of data between the memory and the storage medium, wherein the data is stored as a plurality of data records that are saved on the storage medium residing on the at least one computing device, and wherein at least one of the one or more processing modules are programmed to perform the acts of:
 a) identifying at least one first data record of the plurality of data records saved on the storage medium;
 b) for each of the at least one first data record, associating an identifier therewith that can be used to locate the data thereof as saved on the storage medium;
 c) for each of the at least one first data record, saving the identifier associated therewith in the memory of the mobile device;
 d) identifying at least one second selected data record of the plurality of data records saved on the storage medium for which an identifier associated therewith is saved in the memory of the mobile device;
 e) for each of the at least one second selected data record, determining the location of the data thereof as saved on the storage medium using the identifier associated therewith;
 f) for each of the at least one second selected data record, retrieving at least a subset of the data thereof from the storage medium; and
 g) for each of the at least one second selected data record, saving the at least a subset of the data thereof, as retrieved from the storage medium, in the memory of the mobile device.

28. The mobile device as claimed in claim 27, wherein the at least one remote computing device comprises a server.

29. The mobile device as claimed in claim 28, wherein the server is coupled to the first mobile device by a wireless communication link.

30. The mobile device as claimed in claim 27, wherein each of the plurality of data records comprises data associated with an electronic mail message.

31. The mobile device as claimed in claim 27, wherein each of the plurality of data records comprises data associated with a contact entry.

32. The mobile device as claimed in claim 27, wherein each of the plurality of data records comprises data associated with a calendar entry.

33. The mobile device as claimed in claim 27, wherein acts d) to g) are performed in accordance with an adaptive technique.

34. The mobile device as claimed in claim 27, wherein each identifier that can be used to locate data of a data record as saved on the storage medium comprises either at least one numerical index or at least one pointer.

* * * * *